United States Patent [19]

Zettle

[11] Patent Number: 4,909,559
[45] Date of Patent: Mar. 20, 1990

[54] PROTECTION SYSTEM FOR A VEHICLE CARGO BED

[76] Inventor: Steven Zettle, 1774 NE. Pheasant La., Bend, Oreg. 97701

[21] Appl. No.: 219,350

[22] Filed: Jul. 13, 1988

[51] Int. Cl.⁴ ............................................. B60R 27/00
[52] U.S. Cl. .................................... 296/41; 280/770; 293/102
[58] Field of Search ....................... 296/39.1, 39.2, 41, 296/50, 57.1, 136; 280/770; 267/140; 293/102, 120, 128

[56] References Cited

U.S. PATENT DOCUMENTS

| | | | |
|---|---|---|---|
| 971,028 | 9/1910 | Eskildsen | 296/41 |
| 3,856,194 | 12/1974 | Helm | 293/1 |
| 3,982,780 | 9/1976 | Keith | 293/128 |
| 4,041,999 | 8/1977 | Miller | 296/136 X |
| 4,253,785 | 3/1981 | Bronstein | 410/110 |
| 4,333,678 | 6/1982 | Munoz et al. | 296/39.2 |
| 4,336,963 | 6/1982 | Nix | 296/39.2 |
| 4,575,146 | 3/1986 | Markos | 296/39.2 |
| 4,604,013 | 8/1986 | Elwell et al. | 410/106 |
| 4,707,016 | 11/1987 | McDonald | 296/39.2 |
| 4,763,945 | 8/1988 | Murray | 296/57.1 |
| 4,818,006 | 4/1989 | Arndt | 296/41 X |

OTHER PUBLICATIONS

Dee Zee Co. Product Literature Sheet.
J. C. Whitney, catalog 495L, pp. 49–50, published Jun. 1988.
J. C. Whitney, catalog 483K, p. 57, published Jun 1987.

*Primary Examiner*—Dennis H. Pedder
*Attorney, Agent, or Firm*—Klarquist, Sparkman, Campbell, Leigh & Whinston

[57] ABSTRACT

An apparatus for protecting the upper portions of the side walls of a vehicle cargo bed is disclosed. The apparatus includes an elongate body having a medial section, a first end, and a second end, both ends extending downwardly from the medial section. The first end includes a magnet system which enables its attachment to a vehicle bed wall without mechanical fasteners. The second end includes a hook member adapted to engage the ledge portion normally found in most vehicle cargo beds. The entire apparatus is preferably of one-piece construction, and manufactured of rubber. It also includes a flexible joint between the first end and medial section to facilitate use of the apparatus with walls of different thickness. Finally, the top of the medial section includes a plurality of longitudinally extending ribs designed as shock absorbers for any cargo or objects positioned thereon.

10 Claims, 1 Drawing Sheet

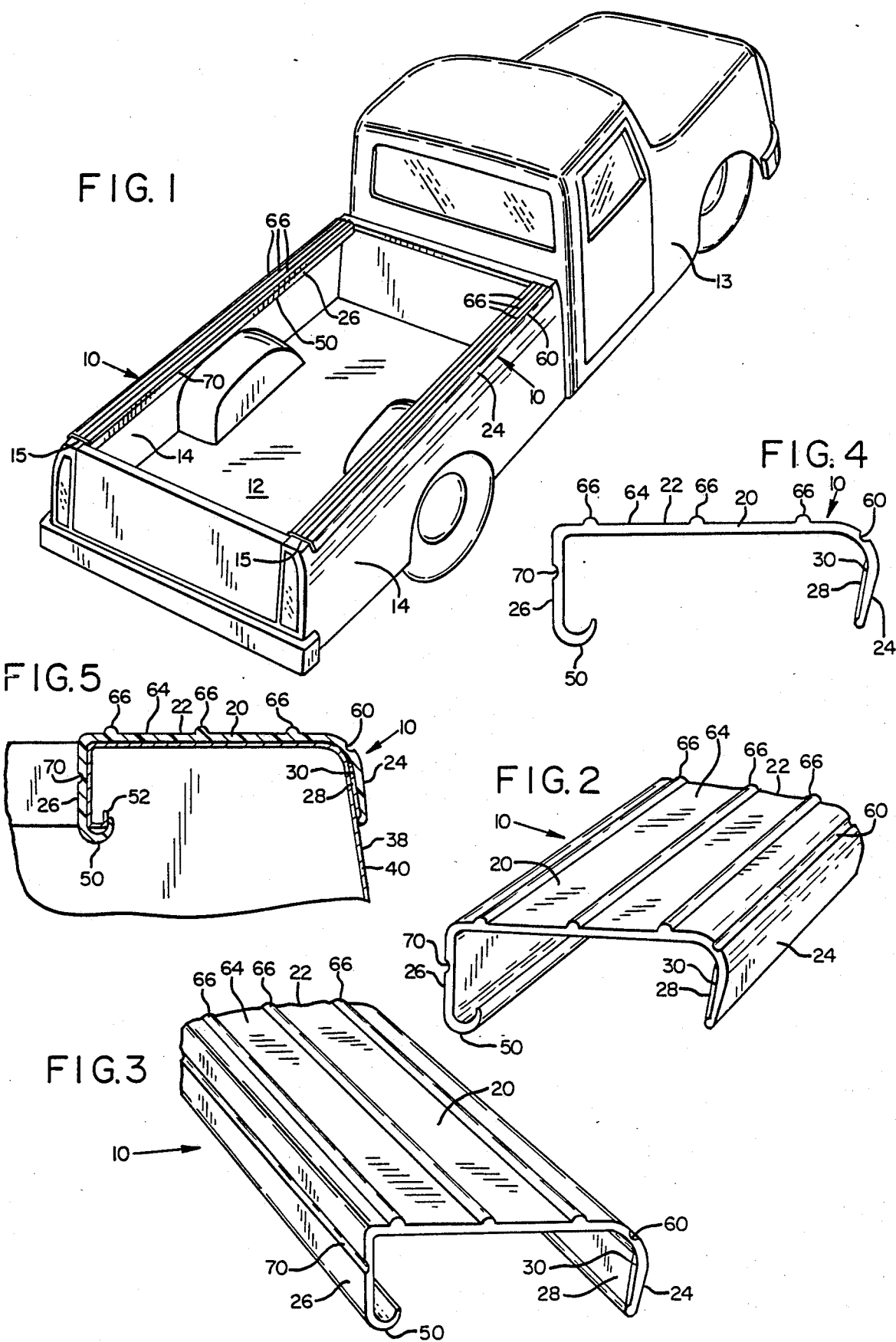

PROTECTION SYSTEM FOR A VEHICLE CARGO BED

This invention generally relates to an accessory for protecting a vehicle cargo bed, and more particularly to an apparatus for protecting the top portions of the side walls of a cargo bed from physical damage during the loading/transport of cargo.

Pick-up trucks and other vehicles having open cargo beds are becoming increasingly popular. However, the costs involved in purchasing and repairing these vehicles have correspondingly increased. It is therefore desirable to protect them from physical damage during the hauling of cargo. This is especially true with respect to the cargo bed portions of the vehicles.

A variety of devices have been constructed to prevent damage to vehicle cargo beds. For example, U.S. Pat. No. 4,253,785 to Bronstein discloses a pick-up truck edge protector/anchoring system consisting of a generally U-shaped channel member positioned on each side of the bed. The channel member is secured in position using bolts.

U.S. Pat. No. 4,707,016 to McDonald discloses a tailgate protection assembly consisting of a cover portion designed to engage the inner face of the tailgate, and a top portion secured to the cover portion for protecting the upper edge of the tailgate. In a preferred embodiment, the top portion is secured to the cover portion using a plurality of rivets.

U.S. Pat. No. 4,575,146 to Markos discloses a protective truck liner which covers the entire bed of the truck including the side walls. The liner is secured in position using a fastening plate which is screwed or bolted to the bed.

However, a need exists for a protection system designed to cover the top portions of the side walls of a cargo bed which is easily attached and detached from the bed as desired. Furthermore, a need exists for a protection system which is readily adaptable to vehicle bed walls of varying thickness. The present invention satisfies these needs in a manner not heretofore known in the art.

SUMMARY OF THE INVENTION

It is an object of the present invention to provide a protection system for a vehicle cargo bed which protects the top portions of the side walls of the bed from physical damage during the loading/transport of cargo.

It is another object of the invention to provide a protection system for a vehicle cargo bed which is of simple construction, and is manufactured from inexpensive, readily available components.

It is a further object of the invention to provide a protection system for a vehicle cargo bed which is readily attached and detached as desired.

It is a still further object of the invention to provide a protection system for a vehicle cargo bed which is highly durable and weather resistant.

It is an even further object of the invention to provide a protection system for a vehicle cargo bed which is adaptable for use with bed walls of varying thickness.

BRIEF DESCRIPTION OF DRAWINGS

FIG. 1 is a perspective view of a conventional pick-up truck bed having protection members produced in accordance with the invention mounted on the side walls of the bed.

FIG. 2 is a perspective view of a protection member produced in accordance with the invention.

FIG. 3 is another perspective view of the protection member illustrated in FIG. 2.

FIG. 4 is an end view of the protection member illustrated in FIG. 2.

FIG. 5 is a cross-sectional view of the protection member illustrated in FIG. 2 shown mounted to the side wall of a vehicle cargo bed.

DETAILED DESCRIPTION OF A PREFERRED EMBODIMENT

The present invention involves a protection member for the side walls of a vehicle cargo bed which prevents damage to the top portions of walls during the loading/transport of cargo. FIG. 1 illustrates a bed 12 of a conventional pick-up truck 13 having protection members 10 produced in accordance with the invention mounted thereon. The protection members 10, as illustrated, are specifically designed to prevent physical damage, abrasion, and the like, to the top portions 15 of the side walls 14 of the bed 12. While the protection members 10 are illustrated in FIG. 1 in connection with a pick-up truck, they may be used with any vehicle designed to transport cargo having side walls which are subject to physical damage.

With reference to FIGS. 2-4, more detailed views of a protection member 10 manufactured in accordance with the invention are shown. Specifically, each protection member 10 includes a body portion 20 preferably constructed of a durable, flexible material (e.g, plastic or rubber). The use of rubber provides numerous benefits. For example, it is durable, light, flexible, and weather resistant.

As shown in FIG. 3, the body portion 20 includes a medial section 22, a first end 24, and a second end 26. The first and second ends 24, 26, extend downwardly from the medal section 22. If the body portion 20 is manufactured of rubber or other flexible material, it is preferred that the medial section 22, first end 24, and second end 26 all be integrally formed in a single unit.

With reference to FIGS. 3-4, the first end 24 of the invention 10 includes magnetic attachment means in the form of a magnet member 28, secured in position along the inner face 30 of the first end 24. The magnet member 28 preferably consists of an uninterrupted strip of magnetic material. In the alternative, individual magnets may be used. A preferred material used to construct the magnet member 28 is a product manufactured by the B. F. Goodrich Co. under the name "Koro Seal". Use of the magnet member 28 enables the first end 24 to be readily attached and detached to the cargo bed without the use of tools or mechanical fasteners. Attachment of the first end 24 to the outside face 38 of a typical cargo bed wall 40 is shown in FIG. 5.

In an alternative embodiment, the first end 24 may be molded or formed to include a magnet member or members integrally therein. In either alternative, the use of a magnetic attachment system represents an advance in the art over conventional attachment means, including bolts, screws, rivets, and the like.

The second end 26 of the body portion 20 extends downwardly from the medial section 22 as illustrated, and terminates in a hook 50. With reference to FIG. 5, the hook 50 is designed to engage a downwardly extending the ledge 52 which is commonly used in nearly all vehicle cargo beds. The ledge 52 may be positioned either inside or outside of the cargo bed, depending on the type of vehicle involved. However, the invention 10 will work equally well regardless of the position of the ledge 52. The hook 50 enables the second end 26 of the body portion 20 to be "snap" fitted with the ledge 52 in order to secure the second end 26 in position.

To accommodate vehicle bed walls of variable thickness, the invention 10 includes size adjustment means in the form of a flexible joint used to connect the first end 24 to the medial section 22. The flexible joint may take a variety of forms. However, in a preferred embodiment where the body portion 20 is manufactured of a single rubber unit, the flexible joint will preferably consist of an elongate groove 60 between the first end 24 and medial section 22. The groove 60 readily enables movement of the first end 24 and medial section 22 relative to each other, thereby allowing the invention 10 to be used in connection with bed walls of variable thickness.

As shown in FIGS. 2 and 3, the top 64 of the medial section 22 includes a plurality of longitudinal ribs 66 spaced equidistantly from each other. In a preferred embodiment where the invention 10 is manufactured of rubber, the ribs 66 are formed integrally with he medial section 22. The ribs 66 are designed to function as shock absorbers/load displacement members when objects or cargo are positioned directly on the top 64 of the medial section 22.

Finally an optional feature of the invention 10 includes an elongate groove 70 midway between the hook 50 of the second end 26 and the medial section 22 which is designed as an inset or "track" for the insertion of mounting screws (not shown). While the invention 10 will operate efficiently and effectively without the use of screws, such screws may be desired for more permanent attachment in order to prevent theft or the like. If screws are used, they would be threaded through the groove 70 of the second end 26, and into the wall 40 of the bed.

The present invention represents an advance in the art of vehicle cargo bed protection. It enables the top portions of the side walls to be protected in a highly efficient manner. Use of the magnetic attachment/hook system allows the invention to be readily attached and detached as desired. Furthermore, it is easily used in connection with bed walls of variable thickness without mechanical adjustment.

Having herein described a preferred embodiment of the invention, it is anticipated that suitable modifications may be made thereto by individuals skilled in the art. For this reason, the scope of the invention shall only be derived from the following claims:

What is claimed is:

1. A protection member for attachment to the top of a vehicle cargo bed wall having a downwardly extending ledge portion at the top thereof, said protection member comprising:
    a body portion comprising a medial section, a first end, and a second end, said first and second ends extending downwardly rom said medial section, said first end comprising magnetic attachment means for securing said first end to said wall, said second end terminating in an integrally formed hook portion for securing said second end to said ledge portion of said wall; and
    a flexible joint between said first end and said medial section, said joint enabling said first end to move relative to said medial section, thereby allowing said protection member to be used with cargo bed walls of variable thickness.

2. The protection member of claim 1 wherein said body portion is comprised of a flexible material selected from the group consisting of rubber and plastic.

3. The protection member of claim 1 wherein said magnetic attachment means comprises at least one magnet member secured to said first end.

4. The protection member of claim 2 wherein said flexible joint comprises a longitudinal groove extending along said body portion between said first end and said medial section.

5. The protection member of claim 1 wherein said medial section comprises a plurality of upwardly extending longitudinal ribs, said ribs functioning as load distributing members for objects positioned on top of said medial section.

6. A protection member for attachment to the top of a vehicle cargo bed wall having a downwardly extending ledge portion at the top thereof, said protection member comprising:
    a body portion comprised of a flexible material selected from the group consisting of rubber and plastic, said body portion further comprising a medial section, a first end, and a second end, said first and second ends extending downwardly from said medial section;
    a flexible joint between said first end and said medial section, said joint enabling said first end to move relative to said medial section, thereby allowing said protection member to be used with cargo bed walls of variable thickness, said joint comprising a longitudinal groove extending along said body portion between said first end and said medial section;
    said first end comprising at least one magnet member for securing said first end to said wall;
    said second end terminating in an integrally formed hook portion for securing said second end to said ledge portion of wall; and
    a plurality of upwardly extending longitudinal ribs on said medial section, said ribs functioning as load distributing members for objects positioned on top of said medial section.

7. A protection member for attachment to the top of a vehicle cargo bed wall having a downwardly extending ledge portion at the top thereof, said protection member comprising:
    a body portion comprising a medial section, a first end, and a second end, said first and second ends extending downwardly from said medial section, said first end comprising magnetic attachment means for securing said first end to said wall, said second end terminating in an integrally formed hook portion for securing said second end to said ledge portion of said wall.

8. The protection member of claim 7 wherein said body portion is comprised of a flexible material selected from the group consisting of rubber and plastic.

9. The protection member of claim 7 wherein said magnetic attachment means comprises at least one magnet member secured to said first end.

10. The protection member of claim 7 further comprising a plurality of upwardly extending longitudinal ribs on said medial section, said ribs functioning as load distributing members for objects positioned on top of said medial section.

* * * * *